AUTOMATIC REPERTORY DIALING SYSTEM

Filed Oct. 24, 1963 2 Sheets-Sheet 1

INVENTORS
WILLIAM W. LOGAN
FRANCIS X. SHATYNSKI
BY
George H. Fritzinger
AGENT

INVENTORS
WILLIAM W. LOGAN
FRANCIS X. SHATYNSKI
BY *George H. Fritzinger*
AGENT

United States Patent Office 3,317,678
Patented May 2, 1967

3,317,678
AUTOMATIC REPERTORY DIALING SYSTEM

William W. Logan, Glen Ridge, and Francis X. Shatynski, Newark, N.J., assignors, by mesne assignments, to DASA Corporation, Andover, Mass., a corporation of California Filed Oct. 24, 1963, Ser. No. 318,640
4 Claims. (Cl. 179—90)

This invention relates to a modification in the automatic telephone repertory dialing system described in the pending Logan et al. application Ser. No. 93,250, filed Mar. 3, 1961 and now abandoned.

In the repertory dialing system described in the foregoing application the digits and letters of telephone subscribers' numbers are recorded on a magnetic record medium in code form, preferably as time signal bands of approximately 40 milliseconds duration for digit 1, 140 milliseconds for digit 2, 240 milliseconds for digit 3, etc. These signal bands are followed on the record medium by erased or non-recorded interdigital spaces normally 550 milliseconds long. However, after recording a digit representing an outside trunk line the user presses an "access" switch to provide an additional 1450 milliseconds of non-recorded space giving a total interdigital time of approximately 2000 milliseconds for outside dial tone. When all of the letters and digits of a telephone number have been recorded the user presses a reset button to provide an additional unrecorded or erased end space of about 2500 milliseconds giving a total end space of about 3000 milliseconds after the last digit. The interdigital and end spaces are determined by a motor driven timing mechanism.

During reproducing, a transducer head scans the track on the record medium bearing the recorded telephone number and converts the spaced recorded signal bands into timed series of dial pulse trains of which each train consists of a number of pulses corresponding to the respective digit dialed when the signal band was recorded. The timing mechanism is driven only during the scanning of each unrecorded space on the record and is set to snap back to home position without performing any control function whenever pickup of a recorded signal band is resumed short of 2500 milliseconds. When the transducer head scans an unrecorded space longer than 2500 milliseconds without encountering any recorded signal—such as occurs when an end space is scanned—the timing mechanism performs a reset operation to return the machine automatically to a start-standby condition. Thus, when the machine is started during reproducing, the transducer head is driven continuously along the successive track portions bearing the recorded digits and interdigital spaces to dial out the successive digits with intervening time gaps according to the lengths of the interdigital spaces. When the longer end space is encountered the transducer head is automatically returned to home position.

It simetimes requires more than 2 seconds to gain access to a trunk line and still, at other times, access is gained very quickly so that a 2 second delay time will seem unnecessarily long to the subscriber. By the present invention these variable situations are coped with by stopping the machine automatically after each dialing of a trunk line, and then letting the user press a restart button the instant he hears dial tone.

The timing mechanism for providing unrecorded interdigital spaces during recording and for stopping the machine and returning the transducer head after the last digit is dialed, comprises a timing member spring biased to home position and connectable to the drive motor by a so-called advance clutch to advance the timing member to operate a series of control switches in sequence. When the machine is conditioned for recording, the advance clutch is engaged at the end of each recorded digit and operation of the first interdigital switch is utilized to stop the drive mechanism and return the timing member to home position. Heretofore, when the user pressed the "access" button the advance clutch was engaged, the drive mechanism was started, the circuit of the first interdigital switch was disabled and the circuit of the second interdigital switch was conditioned so that the timing member would move past the first interdigital switch to the second interdigital switch whereat the drive mechanism would be stopped and the timing member returned to home position. When the reset button was pressed the circuits of both the first and second interdigital switches were disabled, the drive mechanism was started and the circuit of the third control switch was conditioned so that the timing member would move past the first and second interdigital switches without performing any control function and so that operation of the third switch would stop the drive mechanism and return the timing member to home position.

By the present invention the pressing of the "access" button when the machine is conditioned for recording starts the drive mechanism to advance the transducer head for a short interval preferably slightly longer than a normal interdigital interval, say 620 milliseconds long, and after about 200 milliseconds of advance feeds a signal to the head for about a 50 millisecond duration. This 620 milliseconds access-advance interval is added to the normal 480 milliseconds interdigital interval which follows or precedes each recorded digit, as the case may be, before the next digit is dialed.

When the machine is conditioned for reproducing the advance clutch is engaged by the absence of reproduce signals at the start of scanning each no-signal interdigital space on the record medium and, as before, is dropped by the resumption of signal picked up from the record. However, when no signal is picked up at the end of a normal interdigital interval the advance clutch stays engaged to continue to advance the timing member and to hold the first interdigital switch operated during scanning of the access advance interval. The advance of the timing member past the first interdigital switch while the machine is conditioned for reproducing conditions the machine so that any signal picked up will drop out the motor relay and the advance clutch solenoid to stop the machine and return the timing member to home poistion while leaving the transducer head in its advanced position. Once the machine is so stopped, the user waits for dial tone and then presses a restart button to cause the machine to continue scanning the record track. When the head scans an unrecorded end space the machine is again conditioned so that any signal picked up during an advance beyond a normal interdigital interval would stop the machine, but since there is no signal now recorded throughout the whole end space the transducer head is advanced approximately a 1500 millisecond interval to operate the third switch to stop the machine, disengage the advance clutch and return the transducer head to home position.

It is accordingly an object of our invention to provide a novel control system for automatic repertory dialing machines which will automatically stop the machine without returning the transducer head after dialing out a digit representing a trunk line, and which will automatically stop the machine and return the transducer head to home position after the dialing of a last digit of a telephone number.

A further object is to provide an interdigital control system for an automatic repertory dialing machine which upon pressing an "access" control while the machine is conditioned for recording will advance the head by a predetermined distance and record a control signal during a short moment of that advance.

It is a further object to provide an interdigital control system which during playback will stop the machine responsive to a signal picked up from the record following a predetermined unrecorded space and which will both stop the machine and return the transducer head responsive to an absence of signal picked up from the record through a space extending substantially beyond said predetermined space.

A further object is to provide an interdigital control system for an automatic repertory dialing machine which upon the machine being conditioned for reproducing will cause the machine to be stopped without returning the head upon the head picking up a control signal within a predetermined second space following a normal interdigital space, and which will cause the machine to be stopped and the head returned home upon the head scanning a totally unrecorded space greater than the sum of a normal interdigital space and of said second space.

These and other objects and features of the invention will be apparent from the following description and the appended claims.

In the description of the invention reference is had to the accompanying drawings, of which:

Figure 1:
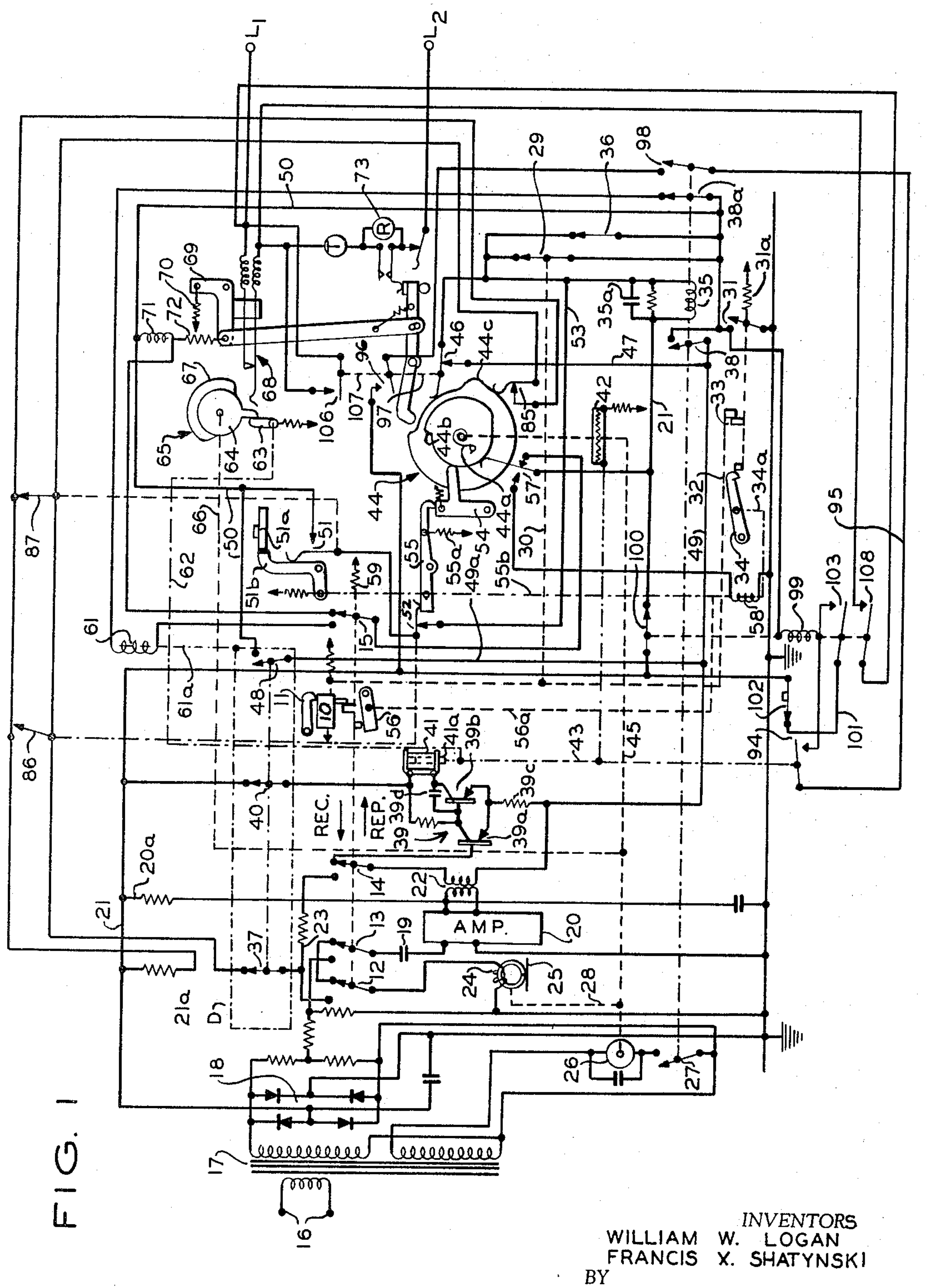
FIGURE 1 is a schematic diagram of circuits and mechanism illustrating the present automatic repertory dialing machine.

The operation of the present repertory dialing system is herein first described as a recorder with reference to FIGURE 1. To condition the machine for standby recording, a push-button 10 is pressed to the left until the same is latched by a manual catch member 11. By so moving the push-button 10 to the left the record-reproduce switches—hereinafter referred to as the RR switches—are moved so that their pole members 12, 13, 14 and 15 are in their left hand positions. The RR switch is itself latched independently of the button 10 by a latch 56. Power to the system is supplied from a 60 cycle power line 16 through a power transformer 17 and a full-wave rectifier 18. A ripple voltage is led from the rectifier 18 through a switch pole 13 and condenser 19 to the input of an amplifier 20 tuned to 120 c.p.s. The amplifier receives its D.C. power from the full-wave rectifier 18 through a negative potential line 21 and lead 20*a*. The output of the amplifier is connected through a transformer 22, pole member 14, lead 23 and pole member 12 to a transducer head 24 which engages a magnetic record medium 25. A drive motor 26 for the machine is connected also to the power transformer 17 through an on-off motor switch 27. Among other things, the motor serves to drive the transducer head 24 relative to the record medium 25 as indicated diagrammatically by the drive coupling 28.

As the record button 10 is shifted leftwardly to its latched position a reset switch 29 is opened by a mechanical linkage 30 diagrammatically shown and a start switch 31 is closed by a mechanical linkage 32 also diagrammatically shown. The linkage 32 includes a one-way coupling indicated at 33 operative to cause the start switch to be operated closed as the record button is shifted to its latched position, but not to influence the record button if the start switch is directly manually operated. Operation of the start switch 31 to closed position causes it to become independently latched by a catch 34. The unlatching of the record button 10 recloses the reset switch 29 but does not affect the RR switches which remain latched in record position by the latch 56. A subsequent operation of a reset solenoid 58 disengages the latch 34 via a coupling 34*a* diagrammatically shown to cause the start switch 31 to be returned to open position by a spring 31*a* and it disengages the latch 56 to cause the RR switches to be returned to normal position by a spring 59.

When the record button 10 is shifted to its latched position it also causes a motor relay 35 to be activated immediately from the power line 21 through a jog switch 36 and the start switch 31. Operation of the motor relay 35 closes the switch 27 to start the drive motor running. Through means not herein shown the jog switch 36 is opened by the movement of the transducer head 24 when the head has been moved for a time interval less than a normal interdigital interval from home position. When the jog switch is so opened control is taken over by the first interdigital switch 46, through a switch 38, to limit the initial jog movement to a normal interdigital distance. During this jog movement the 120 c.p.s. signal current fed to the transducer is swamped out by a relatively heavy D.C. erase current fed to the transducer head from the line 21 through a switch 87 and a switch 37 of a dial mechanism D to provide an initial erase space on the record.

When the motor relay 35 is activated it closes a switch 38 to activate a monostable type of transistor multivibrator 39 from the power line 21 through an interdigital start switch 40 of the dial mechanism D, the multivibrator 39, switch 38 and start switch 31. The multivibrator comprises an input transistor 39*a*, an output transistor 39*b*, a bias resistor 39*c* and a feed back condenser 39*d*. When no signal is fed into the input transistor the output transistor 39*b* is in a stable conductive state to pass current readily from the line 21 through an advance clutch solenoid 41 in its collector circuit, this conductive state being herein referred to as the activated state of the multivibrator. On the other hand, when an A.C. signal is fed from the amplifier into the input transistor 39*a* above a threshold level determined by the bias resistor 39*c* the input transistor rectifies the input signal and changes the bias on the output transistor with a slight delay through action of the feed back condenser 39*d* to cause the output transistor to cutoff and effectively open the circuit through the solenoid 41 with a switch-like action.

The advance clutch solenoid 41 has its armature 41*a* directly mechanically connected to a clutch 42 through a coupling 43 diagrammatically shown to engage the clutch when the solenoid is energized. The instant the clutch 42 is engaged the motor 26 starts turning a timing cam 44 through a drive coupling 45 diagrammatically shown. Typically, the timing cam is driven at a rate of one revolution per 3 seconds. The timing cam 44 is biased into home position shown in FIGURE 1 by means of a torsion spring 44*a*. In 450 milliseconds of driven movement of the timing cam 44 its lobe 44*b* opens the first interdigital limit switch 46 to open a circuit 47 connected through the switch 38 in parallel with the jog switch 36. When the first interdigital limit switch is opened the motor relay 35 is dropped out to stop the motor and to open the switch 38 to stop the multivibrator, which in turn disengages the clutch 42 to cause the timing cam 44 to be snapped back to home position. This provides an initial 450 millisecond jog interval. In all positions of the transducer head past the jog nterval, the jog switch 36 is held open to enable the first interdigital switch 46 to have control.

The switch 37 aforementioned is a dial signal switch and is part of the telephone dial mechanism D indicated by the dash-dot enclosure. This dial mechanism D is preferably of the type disclosed in the pending Kobler et al. application Ser. No. 17,295, filed Mar. 24, 1960 (now Patent No. 3,089,002 issued May 7, 1963) and to which reference may be had as to mechanical details. The dial mechanism D includes the normally closed interdigital start switch 40 and a normally open motor start switch 48. Suffice to say for the present application that on start of windup of the dial from home position the interdigital start switch 40 is opened and so held open until the dial is returned to within 50 milliseconds from home position. Upon release of the dial from an operated position represented by a selected digit the motor start switch 48 is closed in about 10 milliseconds and the dial signal control switch 37 is opened in 80 milliseconds. Closure of the motor start switch 48 supplied power from the line 21 to the motor relay 35 through the interdigital limit switch 46, lead 47, leads 49 and 49*a*, motor start switch 48, lead 50 and start switch 31. At 70 milliseconds after the drive motor is started the dial signal control switch 37 is opened to stop the feed to the transducer head of the D.C. erase current whereby to start the recording of a signal band. At 80 milliseconds before the dial returns to home position, the dial signal control switch 37 is reclosed to feed again the heavy D.C. erase current to the transducer head and start again the erase operation. Since a telephone dial is wound up through two digit intervals to dial digit "1," three intervals to dial digit "2," etc., there is recorded on the record medium a 40 millisecond signal band when the digit "1" is dialed, a 140 millisecond band when the digit "2" is dialed, etc.

When the motor 26 is started responsive to the dial motor start switch 48 being closed, the resultant closure of the switch 38 provides a hold circuit for the motor relay 35 through the switch 38 and the interdigital limit switch 46 to remove the motor start switch 48 as a means of stopping the motor. The motor will therefore continue to run until the interdigital limit switch 46 is opened.

During the recording of a signal band responsive to release of the dial D from an operated position the multivibrator 39 remains in its inactivated state because the interdigital start switch 40 is then opened. However, when the dial is returned to within 50 milliseconds from home postion the interdigital start switch 40 is closed to activate the multivibrator and operate the solenoid 41 whereby to engage the advance clutch 42. The timing cam 44 is therefore started about 50 milliseconds before the dial is returned home. At 450 milliseconds later the interdigital limit switch 46 is opened to drop out the motor relay 35 and stop the drive of the transducer head 24 across the record medium. However, the transducer head remains in its advance position until another digit is dialed or until the machine is reset, as will appear. Thus, upon each dialing operation there is recorded a signal band of predetermined length depending upon the digit dialed plus an unrecorded interdigital space which for the values above given is approximately 550 milliseconds long split 480 milliseconds after the signal band and 70 milliseconds before the next signal band.

After dialing a digit representing a trunk line, at which time the head stands 480 milliseconds past the last dial signal, the user will press an "access" button 51*a* until it is latched by a catch lever 51*b*. Resultant movement of the catch lever 51*b* will open an access shunt switch 87 and will close a control switch 51. The opening of the access shunt switch 87 connects a normally closed access signal switch 85 in the line running from the negative potential line 21 to the dial signal switch 37. The closure of the switch 51 activates the motor relay 35 via the line 21, relay 35, lead 53, second interdigital limit switch 52, the switch 51, the lead 50 and the start switch 31 to start the motor running with continued erase because the dial signal control switch 37 is now closed to feed a D.C. erase current to the transducer head. During this continued erase operation the multivibrator 39 is held activated and the advance clutch 42 is held engaged to cause the timing cam 44 to be driven by the motor 26. When the timing cam has run a short interval of 200 milliseconds from home position, a lobe 44*c* on the cam opens the access signal switch 85 for about a 50 millisecond duration. Since the switch 85 is not now shunted by the access shunt switch 87 as it is during a normal interdigital run, it momentarily removes D.C. erase current from the transducer head to cause a signal to be recorded for about a 50 millisecond duration. When the timing cam 44 has been advanced say 620 milliseconds from home position, the lobe 44*b* causes a lever 54 to be cammed outwardly until latched by a catch member 55. In the outward movement of the lever 54 it causes the second interdigital switch 52 to be opened by a spring 55*a*.

The opening of the second interdigital switch 52 closes the access end switch 86 to restore a shunt across the access signal switch 85. This disables the access signal switch during subsequent dialing, the same as the shunt switch 87 had done originally, until a reset operation is performed. In this connection it will be understood that the access button 51*a* is held latched, the switch 51 is held closed, the switch 52 is held open and the switch 87 is held open until a reset operation is performed after dialing the last digit of a telephone number being recorded. The opening of the second interdigital switch 52 also drops the motor relay 35 to stop the machine. Drop out of motor relay 35 again opens the switch 38 to deactivate the multivibrator which in turn opens the advance clutch 42 to cause the timing cam 44 to be snapped back to home position. Thus, upon pressing the access button after dialing a digit for a trunk line, there is added to the 480 millisecond non-recorded erase interval a second interval of about 620 milliseconds duration in an intermediate portion of which starting 200 milliseconds from the beginning of the interval there is recorded a signal of about 50 milliseconds duration.

After recording the last digit of a telephone number the operator returns the record button 10 to its unoperated position by lifting the latch 11. This return of the record button 10 to unoperated position does not return the RR switch to reproduce position because the RR switch continues to be held operated by the latch 56. The return of the record button 10 does however remove the one-way obstruction 33 from the start switch 31 to allow the start switch to open when the latch 34 is later disengaged and it recloses the reset switch 29 through the coupling 30. Closure of the reset switch 29 activates the motor relay 35 from the line 21 through the start switch 31 and starts the machine running in an erase condition because the dial signal control switch 37 is still in its normally closed position. The instant the motor relay is activated to start the motor running, the switch 38 is closed to activate the solenoid 41 and to engage the clutch 42 to start the timing cam 44 running. The timing cam 44 now is advanced through a 1500 millisecond interval during which it first momentarily opens the access signal switch 85 without effect because this switch is paralleled by the switch 86, opens the first interdigital switch 46 without effect because the switch 46 is paralleled by the reset switch 29, moves past the switch lever 54 controlling the second interdigital switch 52 again without effect because either the manual switch 51 in series with the switch 52 is open (if it had not been pressed to provide access time following the dialing of a trunk line) or if it had been pressed closed the second interdigital switch 52 is already latched closed by the lever 54. When the timing cam is driven about 1500 milliseconds from home position it operates the reset switch 57 to break this switch from its right contact without effect because the right contact is in a line through switch 15, left contact, held open by the switch 38*a*, and connects the reset switch 57 with its left contact to close the reset solenoid 58 with the power line 21. Operation of the reset solenoid disengages the latch 56 through the coupling 56*a* diagrammatically shown to cause the RR switch to be returned to reproduce position by the spring 59. Also operation of the reset solenoid 58 unlatches the catch members 51*b* and 55 through the coupling 55*b* diagrammatically shown to return the switch 51 to open position and the switch 87 to closed position and to return the switch 52 to closed position and the switch 56 to open position. Also, the operation of the reset solenoid 58 disengages the latch 34 via coupling 34*a* diagrammatically shown, to cause the start switch 31 to be returned to open position by the spring 31*a*. The opening of the start switch 31 removes power from both the motor relay 35 and the advance clutch solenoid 41 and, in addition, it returns the transducer head 24 to a start position on the record through means not herein necessary to show. The dropping out of the motor relay 35 stops the drive motor and the deenergization of the solenoid 41 opens the clutch 42 to cause the timing cam 44 to be snapped back to home position. Therefore, a reset operation initiated by returning the record button 10 to unoperated position adds an approximate 1500 milliseconds erase space to the 480 millisecond interdigital space following the last recorded digit to give an approximate 2000 millisecond erase end space, and it causes the transducer head 24 to be then returned home and the machine to be placed in a reproduce-standby condition.

Figure 2:
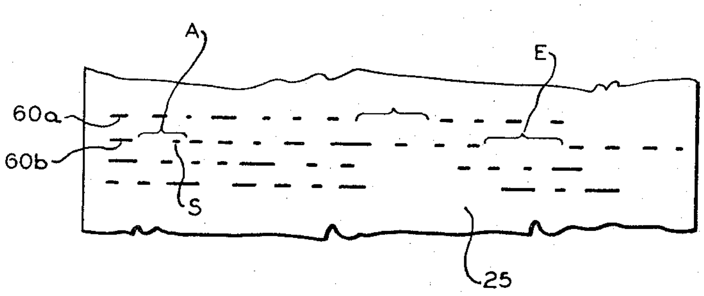
FIGURE 2 is a fractional view showing a section of a tape record with designations representing tracks bearing recorded telephone numbers.

As indicated on the portion of the tape record 25 shown in FIGURE 2, there is a series of parallel transverse tracks bearing respective recorded telephone numbers. These tracks are scanned individually by the transducer head 24 when respective telephone numbers are reproduced and fed out to a telephone line to make switching connections. In these tracks recorded signal bands are indicated by solid heavy lines and unrecorded spaces by absence of any line. Because of the preliminary erase jog movement of the transducer head when the machine is shifted into a record-standby condition, the first recorded signal band of each track starts at a distance interval of 450 millisecond from the left edge of the tape record medium. In a track **60*a* the unrecorded interdigital spaces are shown as being equal but in a track 60*b*** there is an interdigital out dialing space A with a momentary recorded signal S therein following the first recorded signal band representing a digit dialed for making connection to an outside trunk. After the last recorded digit there is an unrecorded end space E which is substantially longer than the space A.

Figures 3A, 3B:
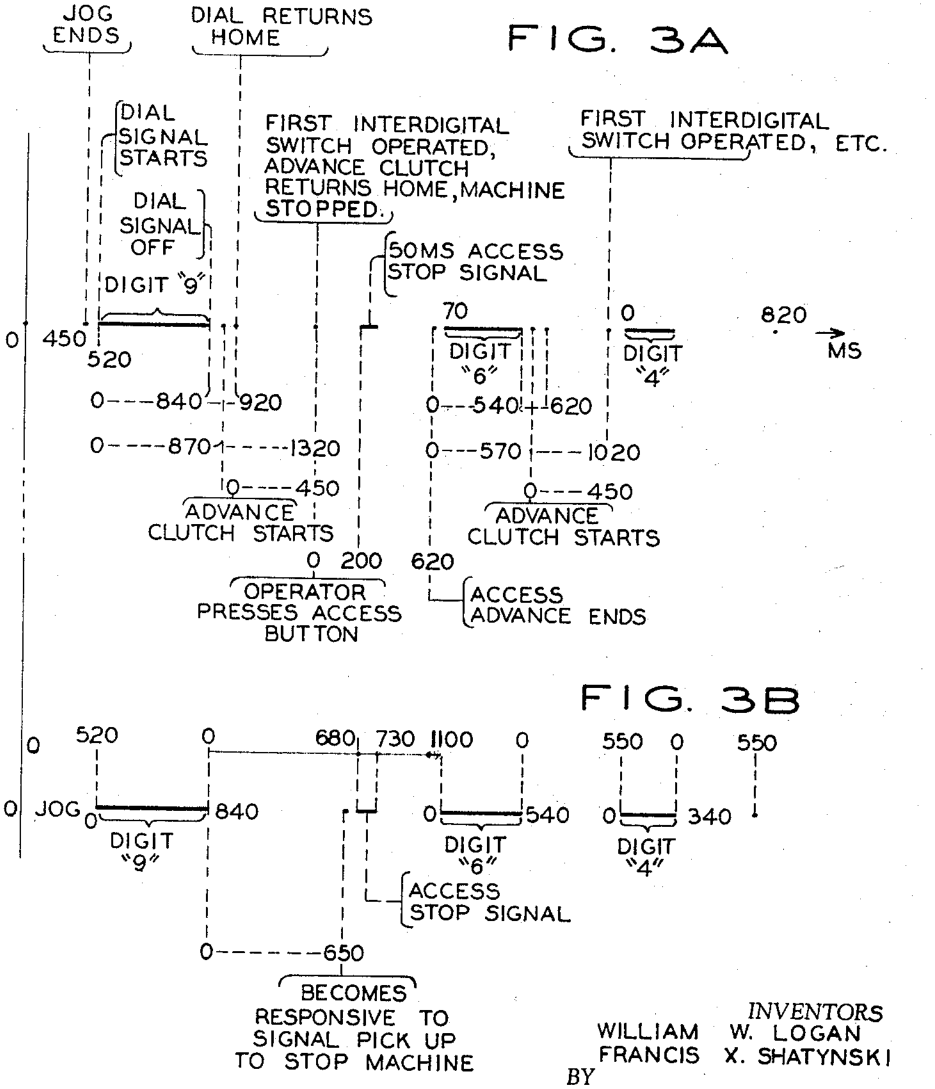
FIGURES 3A and 3B show a portion of a recorded track with notation of time periods respectively significant during recording and reproducing.

In FIGURE 3A is shown a portion of track **60*b*** running through jog, digit "9," access digit "6" and digit "4" with a designation of the time periods of particular significance during recording.

When the machine is in a record-standby condition a latch on the dial D is released by a dial release solenoid 61 mechanically coupled to the dial D as is particularly described and claimed in the Kobler Patent No. 3,104,285, issued Sept. 17, 1963. In the present instance the mechanical coupling to the dial D is diagrammatically indicated by a dash-dot line **61*a*. The dial release solenoid is operated from the power line 21 through the reset limit switch 57 right contact, RR switch pole 15 at its left contact, solenoid 61, and switch 38*a* of the motor relay. When the machine is running whether in record or reproduce condition the switch 38*a* is open, and similarly when the machine is in reproduce-standby condition the switch 15 is open at its left contact, in each case to drop out the solenoid 61** and return the dial to its latched condition.

After a reset operation as well as after each reproducing operation the machine is left in a reproduce condition as shown in FIGURE 1. After the user has placed the transducer in registration with the track bearing the recorded telephone number of the subscriber to be called, he has merely to manually close the start switch 31 in order to start the machine in a reproducing operation to dial the selected subscriber's number. When the start switch 31 is latched closed the motor relay 35 is activated from the line 21 through the reset switch 29 and start switch 31. The motor relay closes the switch 27 to start the motor and closes the switch 38 to activate the multivibrator 39 and engage the clutch 42. The machine then starts moving the transducer head along the selected record track first through the erase jog space with the timing cam being then operated.

The instant the transducer head 24 starts picking up the first dial signal from the record, the signal after being amplified is fed through the switch pole 14 to the multivibrator to deactivate the same. The clutch solenoid 41 therefore drops out to disengage the clutch 42 and cause the timing cam 44 to be snapped back home. The drop out of the advance clutch solenoid 41 performs an additional function now important to the operation of the machine, which is accomplished through a linkage 62 diagrammatically indicated by dash-dot lines. By this linkage a latch 63 is disengaged from a dog 64 of a one-revolution integrating clutch 65 to engage the clutch as the solenoid 41 drops out. The integrating clutch—which is shown in detail in the aforesaid application Ser. No. 93,250—is interposed between the drive member 66 of the motor 26 and a pulsing cam 67. When the dog 64 is released the clutch is engaged to cause the motor to drive the cam 67 at a rate of ten revolutions per second. The pulsing cam operates a normally closed dial pulsing switch 68 connected in a telephone line $L_1L_2$. The pulsing cam has a peripheral recess through forty percent of its peripheral length and a dwell throughout its remaining length for operating the pulsing switch 68 into closed position for 40 milliseconds and into open position for 60 milliseconds of each revolution of the pulsing cam. A 40 millisecond signal band representing digit "1" will momentarily release the dog 64 to cause the pulsing cam 67 to be driven through one full revolution to produce one dial pulse, and a 140 millisecond signal band representing digit "2" will hold the dog 64 released through two excursions thereof past the latch 63 to cause the pulsing cam to be driven through two full revolutions to produce two dial pulses, etc.

During the scanning of unrecorded interdigital spaces the absence of signal from the amplifier to the multivibrator reactivates the multivibrator to reengage the latch 63 and stop the pulsing cam 67 and to engage the clutch 42 to start the timing cam 44. The operation of the dial signal switch 85 about 200 milliseconds from home position has no effect because the switch 12 in the dial signal circuit to the amplifier is now open. Operation of the first interdigital switch 46 to open position in 450 milliseconds has also no effect because the motor relay is now held operated through the reset switch 29 so long as the start switch 31 is closed. Thus, the timing cam will move through a 550 millisecond interval during scanning of each normal interdigital space, and will then drop out without effect as the pickup of the next dial signal begins. When there is an erase advance interval following a normal interdigital interval there is no signal pickup at the 550 millisecond scanning point with the result that the advance clutch 42 stays engaged. When the timing cam is advanced 650 milliseconds from home position a ridge **44*c* on the cam 44 shifts the switch 46 further open (itself without effect) to close a switch 96 connected to the switch 46 by a tie line 97. This closure of the switch 96** prepares the machine so that any signal now picked up will stop the machine. Only 30 milliseconds after the machine is so conditioned, the head scans the access stop signal (see FIGURE 3*b*) to drop out the advance clutch 41 and hold the same dropped for the duration of the access stop signal. The instant the advance clutch solenoid is dropped it opens the clutch 42 to permit snap back of the timing cam 44 to home position and it closes a switch 94 to complete a circuit 95 running from the power lead 21 through the switch 96, a switch 98 of the motor relay 35 now held closed by reason of the motor relay being activated, the switch 94, an access stop relay 99 and the start switch 31 to ground. Operation of the access stop relay 99 opens a switch 100 to drop out the motor relay and stop the machine. Also, the instant the relay 99 was operated it obtained a hold circuit 101 from the power line 21 through a restart switch 102, a hold switch 103, the relay 99 and the start switch 31 to ground. Thus, the switch 100 in the line 21 to the motor relay is retained open to keep the machine in a stopped condition. Although the disengagement of the advance clutch 42 caused the timing cam 44 to be returned home, thereby reclosing the first digital switch 46 and opening the switch 96, this operation of these switches is without any immediate effect. Consequently, when the head scans an access interdigital space the machine is stopped and the timing cam 44 is returned home.

Also, the instant the advance clutch solenoid 41 is dropped out by the pickup of the access stop signal it releases the latch 63 from the dog 64 to start the pulsing cam 67. The starting of the pulsing cam is without effect because the pulsing switch 68 is already shorted by a cam switch 106 connected by the tie line 107 to the first interdigital switch 46 to cause this cam switch to be closed when the first interdigital switch 46 was opened—i.e., at 450 milliseconds of the timing cam from home position. The activation of the access stop relay 99 responsive to the drop out of the advance clutch solenoid 41 when the access stop signal is picked up closes a switch 108 to preserve the short across the pulsing switch 68 until the access stop relay 99 is later dropped out to restart the motor. Thus, any operation of the pulsing switch 68 responsive to pickup of the access stop signal is prevented from feeding any dial pulses into the telephone line.

The cam 44 has to return through only 200 milliseconds interval to reclose the first interdigital switch 46 and will return through this interval before the motor relay 35 is dropped out to open the switch 38, because the dropout of the motor relay is delayed by a condenser **35*a* connected thereacross. An activating circuit for the advance clutch solenoid 41 is therefore preserved via the first interdigital switch 46, reset switch 29 and start switch 31 after the 50 millisecond access stop signal is picked up. Thus, the advance clutch solenoid is dropped for only the duration of the 50 millisecond access stop signal to limit the pulsing cam to one revolution but without feeding any dial pulse into the telephone line because the pulsing switch 68** is shorted from a time before the acccess stop signal is picked up until the machine is restarted as above-described.

Although the drive motor is stopped by the activation of the access stop relay 99, this does not occur before the motor has driven the pulsing cam at least through one revolution of movement by reason of the delayed drop out of the motor relay 35 caused by the shunt condenser **35*a*. During the time the machine is in a stopped condition the advance clutch solenoid 41 stands activated because its activating circuit is maintained as just described, and no signal is now fed into the multivibrator to drop out the advance clutch. Furthermore, the dog 64 stands against the latch 63 during the stopped condition because the cam has been driven through one revolution as described. When the user hears dial tone after the machine is so stopped, he presses the restart switch 102 to drop out the access stop relay and to reclose the switch 100. The machine starts running with the clutch 42 engaged and the latch 63 engaging the dog 64 and with all shunts removed from the pulsing switch 68. When the transducer head has been advanced through the remainder of the access interval—the head begins picking up the next dial signal to drop the advance clutch 42 and return the cam 44 to home position, and to release the latch 63 from the dog 64 to start the pulsing cam running but without activating the access stop relay 99 because the switch 96** now stands open. At the end of scanning the dial signal the drive of the pulsing cam is stopped and the timing cam is started for the duration of scanning the next erased interdigital space. This procedure continues through the scanning of the remaining digit-representing signal bands and interdigital spaces until the end space E (FIGURE 2) is scanned.

As the head scans the end space E the dial signal switch 85, first interdigital switch 46 and second interdigital switch 52 are operated in succession but without effect for the reasons explained above. Further, since no signals are picked up in scanning to the point where the second interdigital switch 52 is operated, the operation of the second interdigital switch 52 is also without effect because the switch 51 in series therewith is now open. However, when the timing cam has been advanced 2000 milliseconds from the end of the last recorded digit, the reset limit switch 57 is operated from its right to its left contacts. The closure of this switch with its left contact closes the power line 21 with the reset solenoid 58. Operation of the reset solenoid returns the transducer head 24 to start position and disengages the latch 34 to return the start switch 31 to open position. The opening of the start switch 31 drops out the motor relay 35 to stop the motor 26, and it drops out the advance clutch solenoid 41 to disengage the clutch 42 and return the timing cam 44 to home position.

From the foregoing description it will be apparent that when the present machine is in reproducing condition it will respond to any momentary signal picked up after the head has scanned a predetermined erased space greater than the length of a normal interdigital space but less than a reset end space to cause the machine to be stopped.

In order that the relay 99 cannot be held operated at the end of reset during reproducing—at which instant the switch 96, switch 98 and the switch 94 would all be closed momentarily until the cam 44 is returned nearly home—the activating circuit 95 and the hold circuit 101 for the relay 99 are led through the start switch 31 so that the relay 99 is dropped when the start switch 31 is opened.

When the second interdigital switch 52 is opened at the end of access run during recording, it first drops out the motor relay 35 which in turn drops out the advance clutch solenoid 41 by opening the switch 38. The switch 94 may thus be closed before the timing cam 44 has returned sufficiently to open the switch 96. In order that this momentary condition may not operate the access stop relay 99, the switch 98 is connected serially in the circuit 95 and controlled by the motor relay 35. The switch 98 is opened simultaneously with the opening of the switch 38 as the motor relay is dropped out. Since the closing of the switch 94 must necessarily follow the opening of the switch 38, it follows that the switch 98 is open before the switch 94 is closed to prevent any possible activation of the access stop relay 99 at the end of access run.

The pulsing switch 68 must be normally closed to render the telephone circuit operative. If power to the machine should fail while the cam 65 is in the portion of a revolution holding the pulsing switch open the telephone would be left in a disabled condition. In order to prevent this possibility from occurring pulsing switch 68 is normally held out of operative relationship with the cam 67. For this purpose the pulsing switch 68 is mounted on a pivoted lever 69 which is biased by a spring 70 to hold the pulsing switch from the cam. When the RR switch is in reproduce position a pulse enabling solenoid 71 is energized from the power line 21 through the reset limit switch 57 right contact, switch pole 15 right contact, solenoid 71, lead 50 and start switch 31. The armature of the pulse enabling solenoid 71 is coupled to a spring 72 to the pivoted lever 69 to shift the pulsing switch 68 into operative relationship with the cam 67 when the machine is in reproducing and in reproduce-standby conditions.

The embodiment of our invention herein particularly shown and described is intended as being illustrative and not limitative of our invention since the same is subject to changes and modifications without departure from the scope thereof, which we endeavor to express according to the following claims.

We claim:

1. In a repertory dialing machine: the combination of means for supporting a record medium, a record-cooperable record-reproduce head, a drive for producing a relative traveling movement between said record medium and head along a track on said record medium, said record track bearing a first recorded digit in code form representing a trunk line followed by a recorded control signal and by a series of recorded digits in code form representing a subscriber's telephone number, said digits of said telephone number being separated by unrecorded interdigital spaces and said control signal being separated from said first digit by a second unrecorded space greater than said respective interdigital spaces, and said track having an unrecorded end space following the last digit of said telephone number greater than said second unrecorded space, including timing means operative during scanning of unrecorded spaces on the record medium for stopping the machine without returning the head responsive to the head picking up a control signal after scanning an unrecorded space greater than said respective interdigital spaces and for stopping the machine and returning the head to its start position responsive to the head scanning an unrecorded space greater than said second unrecorded space.

2. In a repertory dialing machine: the combination of means for supporting a record medium, a record-cooperable record-reproduce head, a drive for producing a relative traveling movement between said record medium and head along a track on said record medium, said track bearing recorded digits in code form separated by interdigital spaces to represent a subscriber's telephone number, including means to start said drive to scan said track from a start position at a fixed speed, and timing means operated during scanning of non-recorded spaces on the record medium for stopping said drive responsive to the head picking up a recorded signal after the head has scanned an unrecorded space greater than said respective interdigital spaces.

3. In a repertory dialing machine: the combination of means for supporting a record medium, a record-cooperable record-reproduce head, a drive for producing a relative traveling movement between said record medium and head along a track on said record medium, said record track bearing successive signal bands of predetermined lengths according to respective digits of a subscriber's telephone number, said bands being separated by unrecorded interdigital spaces each of a given length, including dial pulsing means operative during scanning of said signal bands for producing dialing pulses of numbers according to the lengths of the respective bands, timing means operated during scanning of each unrecorded space in proportion to the length of said space, and means rendered operative by said timing means to stop said machine upon the head picking up a recorded signal after scanning an unrecorded space greater than said respective interdigital spaces.

4. The combination set forth in claim 3 including means operable to restart the machine to dial out the remaining digits of a recorded telephone number after the machine is stopped by said timing means, and means responsive to the head scanning an unrecorded track space of a predetermined length greater than the length of said respective interdigital spaces for stopping the machine and returning the head to start position.

References Cited by the Examiner

UNITED STATES PATENTS

| | | | |
|---|---|---|---|
| 3,156,782 | 11/1964 | Kobler | 179—90.2 |
| 3,229,042 | 1/1966 | Kilburg | 179—90.2 |

KATHLEEN H. CLAFFY, *Primary Examiner.*

J. W. JOHNSON, A. H. GESS, *Assistant Examiners.*